US 11,131,357 B2

(12) United States Patent
Hernandez et al.

(10) Patent No.: US 11,131,357 B2
(45) Date of Patent: Sep. 28, 2021

(54) TORSION BAR SPRING (71) Applicant: Raytheon Company, Waltham, MA (US)

(72) Inventors: Christopher L. Hernandez, Vail, AZ (US); John F. Bugge, Tucson, AZ (US)

(73) Assignee: Raytheon Company, Waltham, MA (US)

(*) Notice: Subject to any disclaimer, the term of this patent is extended or adjusted under 35 U.S.C. 154(b) by 0 days.

(21) Appl. No.: 15/357,929

(22) Filed: Nov. 21, 2016

(65) Prior Publication Data

US 2018/0142750 A1 May 24, 2018

(51) Int. Cl.
*F16F 1/14* (2006.01)
*B60G 11/18* (2006.01)
*F42B 10/14* (2006.01)
*F03G 1/00* (2006.01)

(52) U.S. Cl.
CPC ............. *F16F 1/14* (2013.01); *B60G 11/18* (2013.01); *F42B 10/14* (2013.01); *F03G 1/00* (2013.01)

(58) Field of Classification Search
CPC .... F16F 1/14; F16F 1/16; B60G 11/18; F42B 10/14; F03G 1/10
USPC ........................................ 267/285, 273, 154
See application file for complete search history.

(56) References Cited

U.S. PATENT DOCUMENTS

| 2,257,571 A | * | 9/1941 | Rabe | B60G 11/60 267/276 |
| 2,942,871 A | * | 6/1960 | Kraus | F16F 1/14 267/273 |
| 4,339,986 A | * | 7/1982 | Atkin | B62D 5/083 137/625.24 |
| 4,488,736 A | * | 12/1984 | Aubry | B60G 3/145 267/148 |

(Continued)

FOREIGN PATENT DOCUMENTS

DE 3822417 A1 1/1989
DE 102014223135 A1 5/2016

(Continued)

OTHER PUBLICATIONS

PCT application PCT/US2017/052762, filing date Sep. 21, 2017, Raytheon Company, International Search Report dated Dec. 21, 2017.

*Primary Examiner* — Robert A. Siconolfi
*Assistant Examiner* — San M Aung (57) ABSTRACT A torsion bar spring is disclosed. The torsion bar spring can include a first elongated spring bar made of a resiliently flexible material. The first elongated spring bar can have a first coupling interface portion at a distal end and an interior opening oriented along a longitudinal axis. The torsion bar spring can also include a second elongated spring bar made of a resiliently flexible material. The second elongated spring bar can have a second coupling interface portion at the distal end. The second elongated spring bar can be disposed at least partially in the interior opening of the first (Continued)

elongated spring bar. The first and second elongated spring bars can be directly coupled to one another at the first and second coupling interface portions such that uncoupled portions of the first and second elongated spring bars are rotatable relative to one another about the longitudinal axis.

19 Claims, 6 Drawing Sheets

(56) References Cited

U.S. PATENT DOCUMENTS

| | | | | |
|---|---|---|---|---|
| 4,491,342 A * | 1/1985 | Aubry | ............. | B60G 3/145 |
| | | | | 267/154 |
| 5,020,783 A * | 6/1991 | Schroder | ............. | B62D 55/108 |
| | | | | 267/149 |
| 5,697,847 A * | 12/1997 | Meyer | ............. | F16D 3/80 |
| | | | | 464/160 |
| 6,325,327 B1 * | 12/2001 | Zoppitelli | ............. | B64C 27/001 |
| | | | | 244/17.27 |
| 8,505,888 B2 * | 8/2013 | Whitaker | ............. | F16F 1/16 |
| | | | | 267/273 |
| 9,228,626 B2 * | 1/2016 | Whitaker | ............. | F16F 1/16 |
| 2006/0276248 A1 * | 12/2006 | Sperber | ............. | F16F 1/16 |
| | | | | 464/97 |
| 2007/0102567 A1 | 5/2007 | Lee et al. | | |
| 2013/0300043 A1 * | 11/2013 | Whitaker | ............. | F16F 1/16 |
| | | | | 267/154 |
| 2015/0123328 A1 * | 5/2015 | Whitaker | ............. | F16F 3/02 |
| | | | | 267/154 |

FOREIGN PATENT DOCUMENTS

| | | |
|---|---|---|
| FR | 964473 A | 8/1950 |
| JP | H09-272495 A | 10/1997 |

* cited by examiner

Prior Art

FIG. 1A

Prior Art

TORSION BAR SPRING

BACKGROUND

Many types of springs are available for energy storage. For example, compression springs and tension springs can store energy by compressing or expanding a helically wound wire with an axial force. Another type of spring is a torsion spring (e.g., conventional coiled torsion springs and torsion bars) where energy is stored by applying a torque or twisting force to an end of the spring, which rotates through an angle as the load is applied. All spring systems can be characterized by the amount of energy that can be stored per unit volume. Another property by which springs can be characterized is the amount of energy that can be stored per unit mass (or weight). Therefore, the performance of devices that utilize springs for energy storage can be improved by increasing the amount of energy that can be stored by the springs per unit volume and/or per unit mass.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

With regard to torsion springs, conventional spring designs have shortcomings that may preclude their use in certain applications. For example, a torsion bar that achieves a desired angle of rotation may be too long for the space constraints of a given application. Similarly, a coiled torsion spring may have a diameter that exceeds the space constraints of a given application. In such cases, a torsion spring is desired that provides increased energy storage per unit volume and/or per unit mass over conventional torsion spring designs, such that a desired level of spring performance is achieved within a relatively compact space envelope.

Accordingly, a torsion bar spring is disclosed that provides increased energy storage per unit volume and/or per unit mass over conventional torsion spring designs. In one aspect, the torsion bar spring can be used as both an energy storage device and a hinge pin for spring-loaded hinged mechanism applications. The torsion bar spring can include a first elongated spring bar made of a resiliently flexible material. The first elongated spring bar can have a first coupling interface portion at a distal end and an interior opening oriented along a longitudinal axis. The torsion bar spring can also include a second elongated spring bar made of a resiliently flexible material. The second elongated spring bar can have a second coupling interface portion at the distal end. The second elongated spring bar can be disposed at least partially in the interior opening of the first elongated spring bar. The first and second elongated spring bars can be directly coupled to one another at the first and second coupling interface portions such that uncoupled portions of the first and second elongated spring bars are rotatable relative to one another about the longitudinal axis.

In one aspect, a torsion bar spring system is disclosed. The system can include a first component, a second component, and a torsion bar spring operably coupled to the first component and the second component to facilitate relative rotation of the first and second components. The torsion bar spring can include a first elongated spring bar made of a resiliently flexible material. The first elongated spring bar can have a first coupling interface portion at a distal end and an interior opening oriented along a longitudinal axis. The torsion bar spring can also include a second elongated spring bar made of a resiliently flexible material. The second elongated spring bar can have a second coupling interface portion at the distal end. The second elongated spring bar can be disposed at least partially in the interior opening of the first elongated spring bar. The first and second elongated spring bars can be directly coupled to one another at the first and second coupling interface portions such that uncoupled portions of the first and second elongated spring bars are rotatable relative to one another about the longitudinal axis.

Figure 1A:
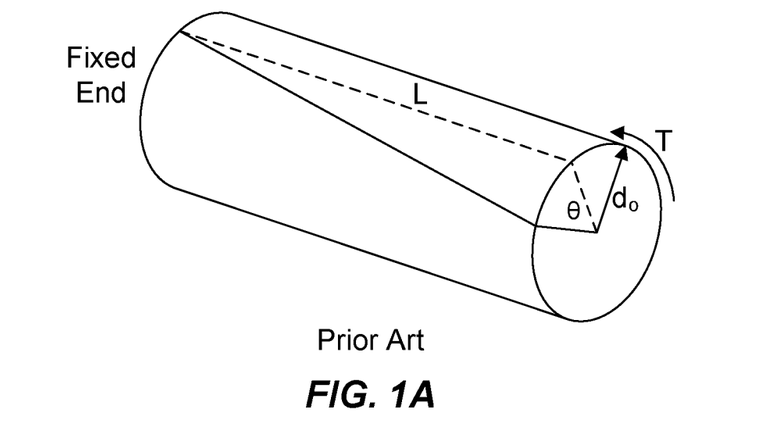
FIG. 1A illustrates a solid bar subjected to torsional loading.
Figure 1B:
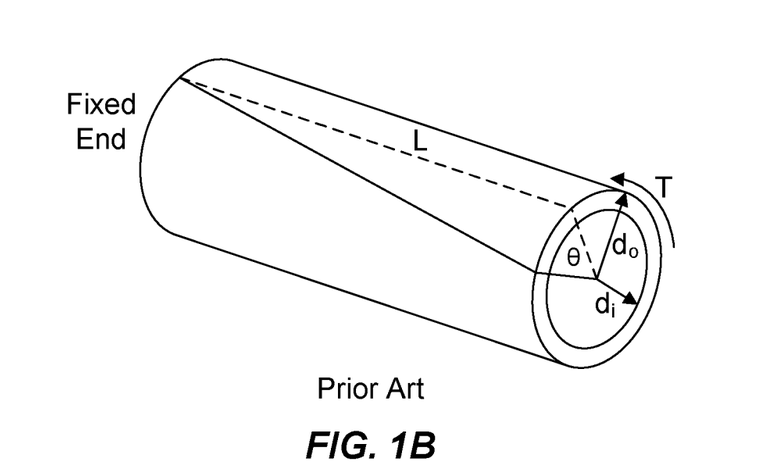
FIG. 1B illustrates a tubular bar subjected to torsional loading.

Solid and tubular bars subjected to torsional loading are illustrated in FIGS. 1A and 1B, respectively, and represent conventional types of torsion bar springs. For a solid circular cross-section bar (FIG. 1A), the angle of deflection θ is given by:

$$\theta_{solid} = \frac{TL}{JG} = \frac{32TL}{\pi G d_o^4}$$

and for a tubular circular cross-section bar (FIG. 1B), the angle of deflection θ is given by:

$$\theta_{tube} = \frac{TL}{JG} = \frac{32TL}{\pi G(d_o^4 - d_i^4)}$$

where T is torque, L is the length of the bar, J is the polar moment of inertia, G is the shear modulus, $d_o$ is the outer diameter, and $d_i$ is the inner diameter.

Torsion bar springs as in FIGS. 1A and 1B produce relatively high torque when rotated by a relatively small angular displacement (i.e., angle of twist). From the above equations, it can be seen that bar length and diameter can alter the resulting angular displacement given a required torque. For example, increasing length and decreasing outer diameter can increase angular displacement. Thus, if the same amount of torque is desired over a larger angular displacement, the bar length must increase so as not to over stress the material and cause failure of the spring. However, available design space may not always accommodate such an increase in bar length. The technology of the present disclosure addresses this issue, among other things.

Figure 2:
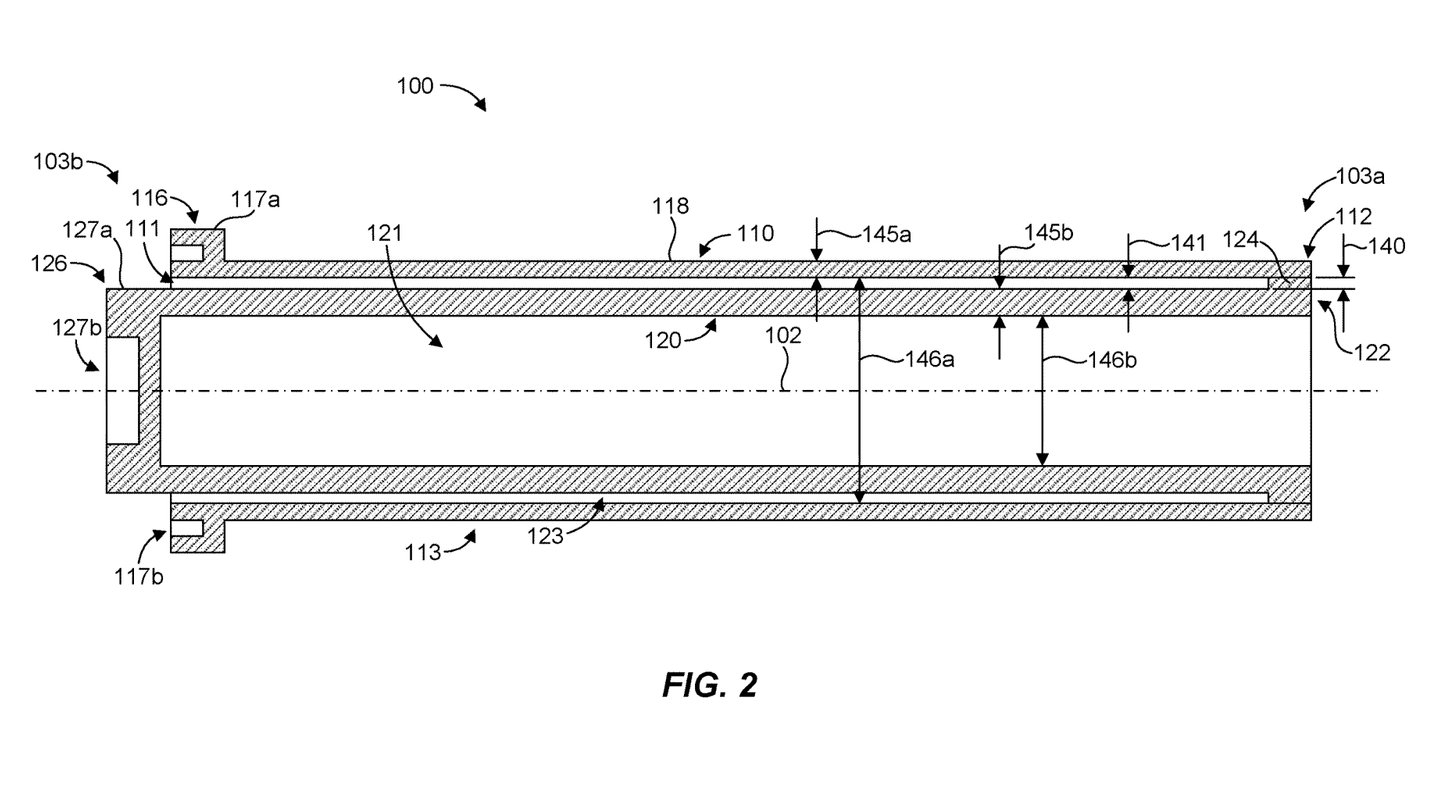
FIG. 2 is a cross-sectional view of a torsion bar spring in accordance with an example of the present disclosure.

One example of a torsion bar spring 100 in accordance with the present disclosure is illustrated in cross-section in FIG. 2. In general, the torsion bar spring 100 can comprise multiple elongated spring bars 110, 120 that can be twisted or torqued about a longitudinal axis 102. The elongated spring bar 110 can have an interior opening 111 oriented along the longitudinal axis 102. In one aspect, the elongated spring bar 110 can have a tubular configuration. The elongated spring bar 120 can be disposed at least partially in the interior (through opening 111) of the elongated spring bar 110. The elongated spring bars 110, 120 can be axially aligned or concentric about the longitudinal axis 102. The elongated spring bar 120 can have any suitable configuration, such as an interior opening 121 oriented along the longitudinal axis 102 (e.g., a tubular configuration) or the elongated spring bar 120 can be solid. A spring bar (e.g., spring bars 110, 120) disclosed herein is considered "elongated" regardless of the diameter and length, since the length will generally be greater than the diameter.

The elongated spring bars 110, 120 can also have coupling interface portions 112, 122, respectively, at a distal end 103a of the torsion bar spring 100. The elongated spring bars 110, 120 can be directly coupled to one another at the coupling interface portions 112, 122 in a manner to transfer torque about the longitudinal axis 102, such that uncoupled portions 113, 123 of the elongated spring bars 110, 120 are rotatable relative to one another about the longitudinal axis 102. By directly coupling the elongated spring bars 110, 120 to one another, torque can be transferred directly between the elongated spring bars, with no intermediate structure or component. As described in further detail below, in some embodiments, the coupling interface portions 112, 122 can be configured to facilitate direct coupling to one another with no additional hardware or parts needed. Thus, there is a direct load path from the elongated spring bar 110 to the elongated spring bar 120, with no intermediate structure or component in the load path. At a minimum, the elongated spring bars 110, 120 can be fixedly coupled to one another at the coupling interface portions 112, 122 to prevent relative movement in a rotational degree of freedom about the longitudinal axis 102. It is noted that the elongated spring bars 110, 120 can be fixedly coupled to one another at the coupling interface portions 112, 122 to prevent relative movement in any suitable rotational and/or translational degree of freedom.

In one aspect, the coupling interface portion 112 and/or the coupling interface portion 122 can comprise a shoulder or flange extending radially relative to the longitudinal axis 102. For example, as shown in FIG. 2, the coupling interface portion 122 of the elongated spring bar 120 includes a shoulder 124 that extends in a radially outward direction relative to the longitudinal axis 102. In some embodiments, the coupling interface portion 112 of the elongated spring bar 110 can include a shoulder (not shown) that extends in a radially inward direction relative to the longitudinal axis 102. The radial dimension 140 of one or more shoulders or flanges (e.g., the shoulder 124) can be equal to a gap 141 between the uncoupled portions 113, 123 that remain of the elongated spring bars 110, 120. In other words, a shoulder or shoulders can be configured to provide the gap 141. It should be recognized that coupling interface portions can have any suitable configuration.

Figure 3A:
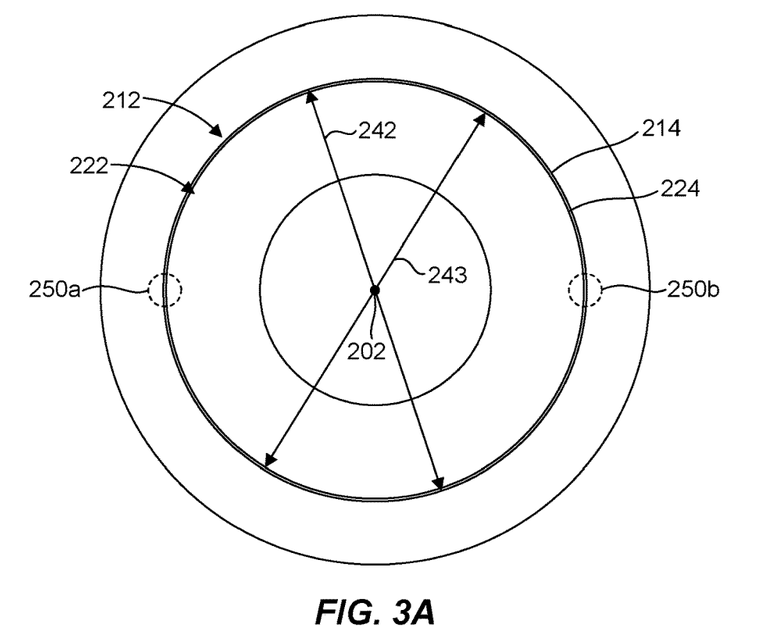
FIG. 3A is an end view of elongated spring bar coupling interface portions of a torsion bar spring in accordance with an example of the present disclosure.

For example, FIG. 3A illustrates an end view of elongated spring bar coupling interface portions 212, 222. In this case, outer surfaces 214, 224 of the respective coupling interface portions 212, 222 have circular cross-sections, which can provide cylindrical or conical surfaces. The coupling interface portions 212, 222 can have any suitable type of fit with one another. For example, an inner diameter 242 of the outer coupling interface portion 212 and an outer diameter 243 of the inner coupling interface portion 222 can be sized for a clearance fit, a transition fit, or an interference fit. In addition, relative rotation between the coupling interface portions 212, 222 about a longitudinal axis 202 can be prevented in any suitable manner. For example, an interference fit between the coupling interface portions 212, 222 may be sufficient to prevent relative rotation about the longitudinal axis 202. On the other hand, coupling interface portions 212, 222 with a clearance or transition fit may be prevented from relative rotation about the longitudinal axis 202 by a weld or adhesive at the interface. Thus, in some embodiments, the coupling interface portions 212, 222 can be directly coupled to one another with no additional hardware or parts needed. In one aspect, pins or dowels 250a, 250b may be internally fitted at the coupling interface portions 212, 222 to provide mechanical resistance to relative rotation about the longitudinal axis 202 that is sufficient to prevent such relative rotation. In this case, the coupling interface portions 212, 222 can be coupled to one another with no external hardware or parts needed.

Figure 3B:
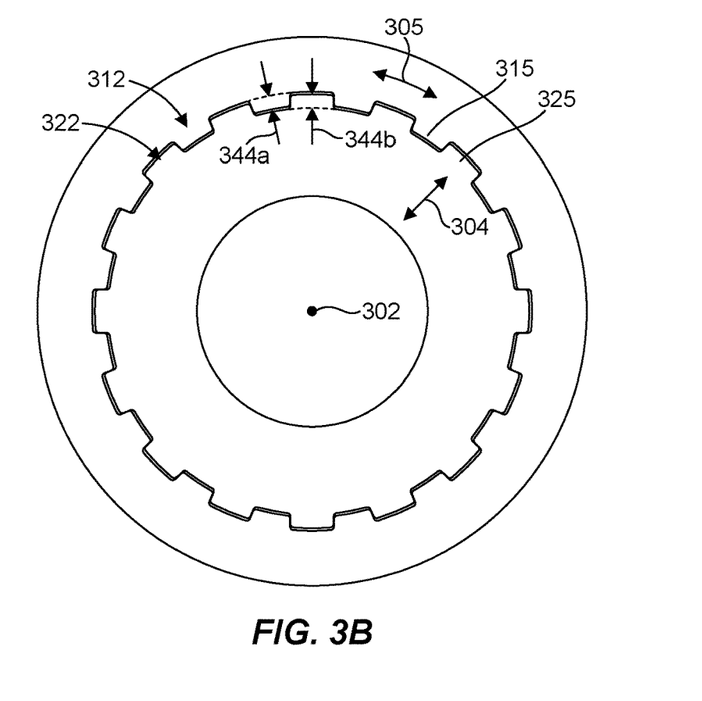
FIG. 3B is an end view of elongated spring bar coupling interface portions of a torsion bar spring in accordance with another example of the present disclosure.

FIG. 3B illustrates an end view of elongated spring bar coupling interface portions 312, 322 in accordance with another example. In this case, the coupling interface portions 312, 322 comprise complementary protrusions 315, 325 that overlap one another in a radial direction 304 and are offset from one another in a circumferential arrangement and direction 305 about a longitudinal axis 302. The protrusions 315, 325 can be of any suitable configuration. For example, the protrusions 315, 325 can be splines of any suitable configuration, such as castellated profile splines (as shown) or any other suitable spline profile or shape. The coupling interface portions 312, 322 can have any suitable type of fit with one another. For example, the complementary protrusions 315, 325 of the coupling interface portions 312, 322 can be sized for a clearance fit, a transition fit, or an interference fit. The geometry of the complementary protrusions 315, 325 can provide a mechanical resistance to relative rotation between the coupling interface portions 312, 322 about the longitudinal axis 302 that is sufficient to prevent such relative rotation. In one aspect, the protrusions 315, 325 can extend parallel to the longitudinal axis 302 or may extend helically about the longitudinal axis 302. In another aspect, the protrusions 315, 325 can extend in the radial direction 304 from a cylindrical base shape or a conical base shape (i.e., tapering along the longitudinal axis 302). In a further aspect, radial heights 344a, 344b of the respective protrusions 315, 325 can be constant or variable (e.g., tapering in height) along the longitudinal axis 302. In addition, a weld or adhesive can be applied at the interface of the protrusions 315, 325 to fix the coupling interface portions 312, 322 to one another. Thus, the coupling interface portions 312, 322 can be directly coupled to one another with no additional hardware or parts needed.

Referring again to FIG. 2, with the elongated spring bars 110, 120 coupled to one another in series, the torque carried by each elongated spring bar is identical. Therefore, the elongated spring bar 110 and the elongated spring bar 120 can be designed to handle the same torque. If one elongated spring bar is significantly stronger than another, then the torsion bar spring 100 will not be optimized. The stronger elongated spring bar will have unnecessary mass and stiffness, both of which reduce the performance. Therefore, geometry of the respective elongated spring bars 110, 120, such as wall thicknesses 145a, 145b and/or inner diameters 146a, 146b, are interrelated and can vary in a corresponding manner due to the elongated spring bars 110, 120 being subjected to the same torque. As mentioned above, the inner elongated spring bar 120 can be solid or tubular. Thus, the inner diameter 146b of the elongated spring bar 120 can vary between zero (i.e., a solid bar) and a maximum amount that may be limited by factors such as the inner diameter 146a of the elongated spring bar 110, the wall thickness 145b of the elongated spring bar 120, and the gap 141 between the uncoupled portions 113, 123 of the elongated spring bars 110, 120.

In many cases, space constraints will dictate maximum outer dimensions of the torsion bar spring 100 in addition to torque and/or displacement requirements. Thus, given a desired gap 141, the wall thicknesses 145a, 145b of the respective elongated spring bars 110, 120 are variable to achieve a desired or optimized design. As the wall thickness 145a of the outer elongated spring bar 110 increases to accommodate a given torque, the wall thickness 145b of the inner elongated spring bar 120 can also increase until the wall thickness equals the radius of the elongated spring bar 120 at which point the inner elongated spring bar 120 is solid. On the other hand, some torsion bar spring designs may not need to accommodate a physical space, but may instead be driven primarily by a required maximum torque. In this case, an inner elongated spring bar may drive the dimensions. For example, the inner elongated spring bar 120 may be solid and the thickness 145a of the outer elongated spring bar 110 may be adjusted accordingly while preserving a given desired gap 141 between the uncoupled portions 113, 123 of the elongated spring bars 110, 120. As the wall thickness 145b of the inner elongated spring bar 120 increases, the wall thickness 145a of the outer elongated spring bar 110 can increase (if space permits) to preserve the gap 141 and/or a higher strength material may be selected for use in one or both of the elongated spring bars 110, 120 in order to maintain a thinner wall thickness. Thus, performance of the torsion bar spring 100 can be optimized by varying dimensions of the elongated spring bars 110, 120 while ensuring stress margins are maintained.

One advantage of the torsion bar spring 100 is that with the elongated spring bar 120 nested within the elongated spring bar 110, the torsion bar spring 100 can simulate additional length and decreasing diameter without actually changing the overall size envelope (e.g., increasing overall length). The result is an increase in angular displacement at a given maximum torque and an increase in potential energy storage in a compact volume (i.e., an increase in energy density per unit volume).

The elongated spring bars 110, 120 can be made of any suitable resiliently flexible material, such as metal (e.g., alloys based on iron, titanium, aluminum, nickel, etc.), fiber-reinforced composite (e.g., carbon fiber, glass fiber, aramid fiber, etc.), and/or various high modulus reinforced engineering plastics (e.g., fiber reinforced PEEK, glass filled PET, or various filled aromatic polyimides). In one aspect, the elongated spring bars 110, 120 can be made of different resiliently flexible materials. In another aspect, the elongated spring bars 110, 120 can be made of the same resiliently flexible material. In a particular example, the elongated spring bars 110, 120 can be made of a metal material, such as steel or titanium. In this case, the coupling interface portions 112, 122 can be welded to one another by any suitable technique or process (e.g., electron beam welding, orbital welding, etc.). Thus, precision elongated spring bars 110, 120 can be made from identical material, welded together at the coupling interface portions 112, 122, and heat-treated to produce a highly reliable torsion bar spring. In another example, an adhesive, such as an epoxy, can be used to secure the coupling interface portions 112, 122 to one another, although other materials or methods may be used.

The torsion bar spring 100 can also include mounting portions 116, 126 associated with each of the elongated spring bars 110, 120, respectively, to facilitate coupling the torsion bar spring 100 to external components, such as an input device and/or a driven component. In the example illustrated in FIG. 2, the mounting portions 116, 126 are associated with the respective elongated spring bars 110, 120 at a proximal end 103b of the torsion bar spring 100. The mounting portions 116, 126 can have any configuration that can be used to attach the torsion bar spring 100 to external components or devices. For example, the mounting portions 116, 126 can have external features 117a, 127a, such as parallel flat surfaces or splines, configured to mate or interface with external components. In another example, the mounting portions 116, 126 can have internal features 117b, 127b, such as threaded holes or sockets, configured to mate or interface with external components. In general, the mounting portions 116, 126 are located at ends of the uncoupled portions 113, 123 of the elongated spring bars 110, 120 opposite the coupling interface portions 112, 122 and are exposed to facilitate coupling with external components. Due to the even number of elongated spring bars, the mounting portions 116, 126 are located at the same end of the torsion bar spring 100.

Although the interior opening 121 of the elongated spring bar 120 is shown as a blind opening due to the illustrated configuration of the internal mounting feature 127b, it should be recognized that the interior opening 121 may extend completely through the elongated spring bar 120 along the longitudinal axis 102.

In one aspect, an outer surface 118 of the outer elongated spring bar 110 can be configured as a locating feature and/or a bearing surface for interfacing with an external component to maintain a positional relationship of the external component about the axis 102. In this case, the torsion bar spring 100 can also serve as a hinge pin for external components that rotate about the axis 102. The torsion bar spring 100 can therefore provide the dual functions of maintaining a pivot or hinge connection between two components and providing energy storage/return for the components (e.g., a spring-loaded hinged mechanism).

Figure 4:
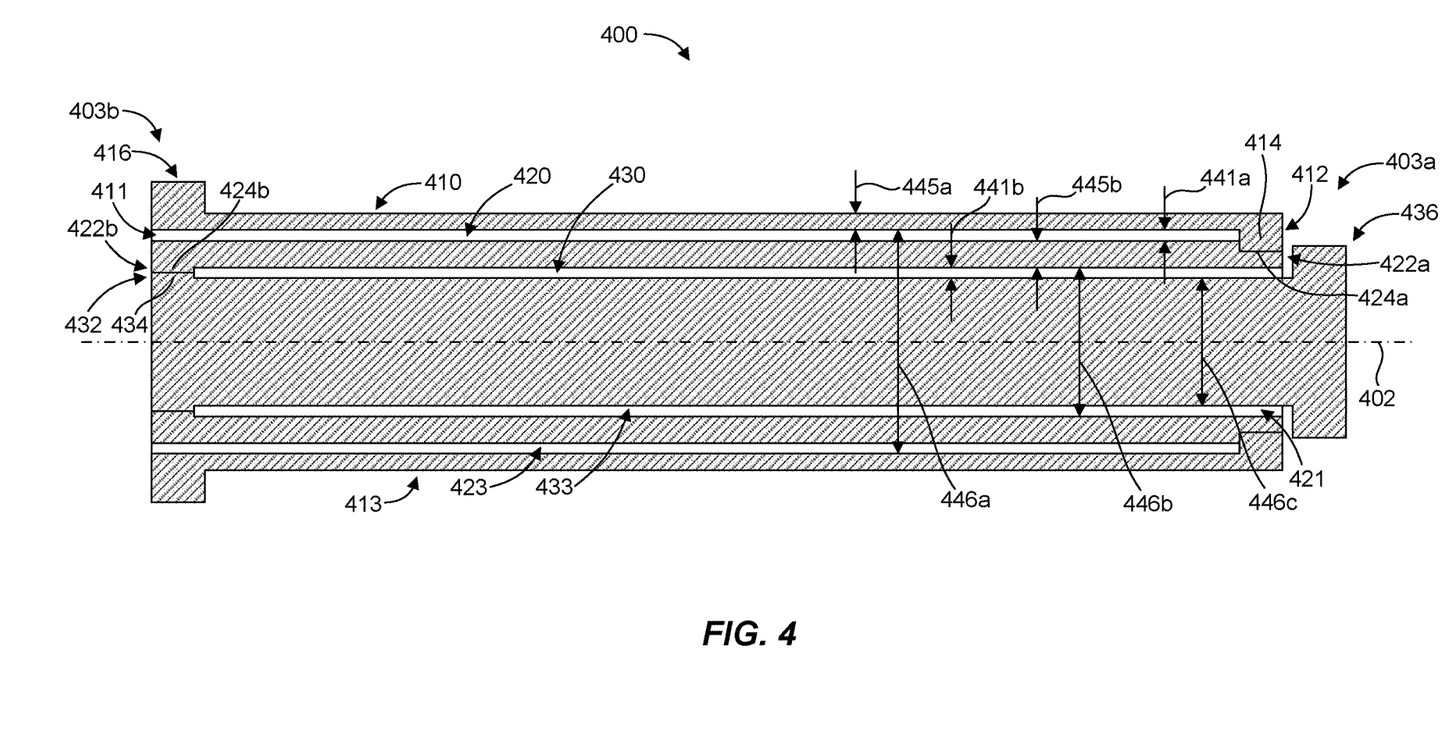
FIG. 4 is a cross-sectional view of a torsion bar spring in accordance with another example of the present disclosure.

FIG. 4 illustrates a torsion bar spring 400 in accordance with another example of the present disclosure. The torsion bar spring 400 is similar to the torsion bar spring 100 in many respects. For example, the torsion bar spring 400 includes multiple elongated spring bars 410, 420, 430 made of resiliently flexible materials that can be twisted or torqued about a longitudinal axis 402. The elongated spring bars 410, 420 can have interior openings 411, 421 oriented along the longitudinal axis 402. In one aspect, the elongated spring bars 410, 420 can each have a tubular configuration. The elongated spring bar 420 can be disposed at least partially in the interior opening 411 of the elongated spring bar 410. The elongated spring bars 410, 420 have coupling interface portions 412, 422a, respectively, at a distal end 403a of the torsion bar spring 400. The elongated spring bars 410, 420 can be directly coupled to one another at the coupling interface portions 412, 422a in a manner to transfer torque about the longitudinal axis 402, such that uncoupled portions 413, 423 of the elongated spring bars 410, 420 are rotatable relative to one another about the longitudinal axis 402.

In this case, the elongated spring bar 420 also includes a coupling interface portion 422b at a proximal end 403a of the torsion bar spring 400. The elongated spring bar 430 can be disposed at least partially in the interior opening 421 of the elongated spring bar 420. The elongated spring bar 430 also includes a coupling interface portion 432 at the proximal end 403a of the torsion bar spring 400. Thus, the elongated spring bars 420, 430 can be directly coupled to one another at the coupling interface portions 422b, 432 in a manner to transfer torque about the longitudinal axis 402, such that uncoupled portions 423, 433 of the elongated spring bars 420, 430 are rotatable relative to one another about the longitudinal axis 402. The elongated spring bars 410, 420, 430 can be axially aligned or concentric about the longitudinal axis 402. The elongated spring bar 430 can have any suitable configuration, such as an interior opening (not shown) oriented along the longitudinal axis 402 (e.g., a tubular configuration) or the elongated spring bar 430 can be solid, as shown.

The coupling interface portions 412, 422a, 422b, 432 can have any suitable configuration. In one aspect, one coupling interface portion can include a shoulder or flange extending radially relative to the longitudinal axis 402 and a corresponding coupling interface portion can include a recess configured to mate with and receive a portion of the shoulder or flange. In the example illustrated in FIG. 4, the coupling interface portion 412 of the elongated spring bar 410 includes a shoulder 414 that extends in a radially inward direction relative to the longitudinal axis 402. In addition, the coupling interface portion 422a of the elongated spring bar 420 includes a recess 424a configured to mate with and receive a portion of the shoulder 414. The shoulder 414 and the recess 424a can be configured to provide a gap 441a between the uncoupled portions 413, 423 of the elongated spring bars 410, 420. It should be recognized that although the coupling interface portion 412 in this example includes the shoulder 414 and the coupling interface portion 422a includes the recess 424a, in some embodiments, the coupling interface portion 412 can include a recess and coupling interface portion 422a can include a shoulder.

In another aspect, corresponding coupling interface portions can each comprise a shoulder or flange extending radially relative to the longitudinal axis 402. For example, the coupling interface portion 422b of the elongated spring bar 420 includes a shoulder 424b that extends in a radially inward direction relative to the longitudinal axis 402, and the coupling interface portion 432 of the elongated spring bar 430 includes a shoulder 434 that extends in a radially outward direction relative to the longitudinal axis 402. The shoulders 424b, 432 can be configured to provide a gap 441b between the uncoupled portions 423, 433 of the elongated spring bars 420, 430.

Geometry of the elongated spring bars 410, 420, 430, such as diameter (e.g., inner diameters 446a-b and outer diameter 446c), wall thickness (e.g., wall thicknesses 445a-b), etc., can be determined as described above, in this case, accounting for a third elongated spring bar 430. Coupling a series of nested elongated spring bars at opposite ends can provide a compact assembly configured to meet the requirements of a given design. It should be recognized that any number of elongated spring bars can be utilized having any suitable dimension to achieve a given angular displacement at a given maximum torque and/or to maintain an adequate stress margin.

The torsion bar spring 400 can also include mounting portions 416, 436 associated with each of the elongated spring bars 410, 430, respectively, to facilitate coupling the torsion bar spring 400 to external components, such as an input device and/or a driven component. In the example illustrated in FIG. 4, the mounting portion 416 is associated with the elongated spring bar 410 at the proximal end 403b of the torsion bar spring 400, and the mounting portion 436 is associated with the elongated spring bar 430 at the distal end 403a of the torsion bar spring 400. Due to the odd number of elongated spring bars, the mounting portions 416, 436 are located at opposite ends of the torsion bar spring 400.

Figure 5:
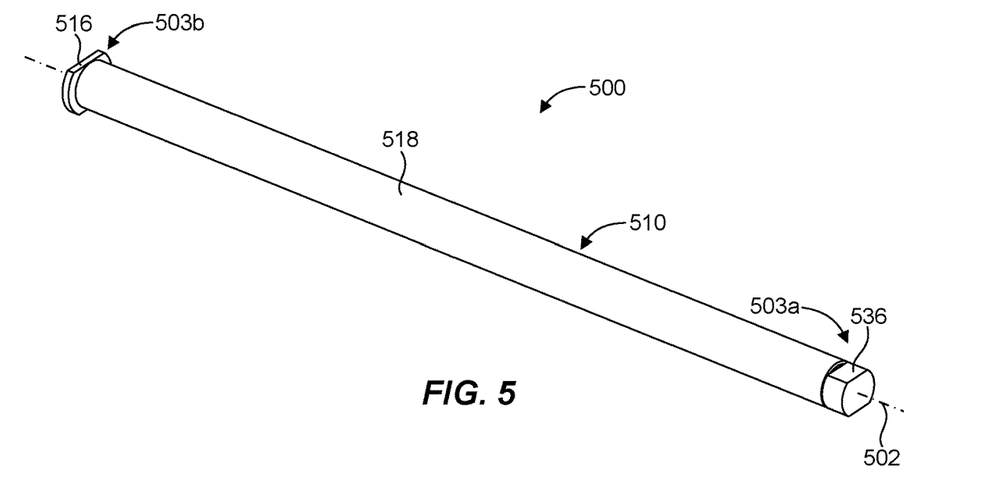
FIG. 5 is a perspective view of a torsion bar spring in accordance with an example of the present disclosure.

FIG. 5 illustrates a perspective view of a torsion bar spring 500 in accordance with an example of the present disclosure. The torsion bar spring 500 may have a similar configuration to the torsion bar spring 400 of FIG. 4, where elongated spring bars are arranged such that mounting portions 516, 536 for coupling the torsion bar spring 500 to external components are located at opposite ends (e.g., distal 503a and proximal 503b ends) of the torsion bar spring 500. In one aspect, the torsion bar spring 500 can be configured as a hinge pin for use in a mechanism that requires torsional forces or torque between two connected external components (e.g., a spring-loaded hinged mechanism). In this case, an outer surface 518 of an outer elongated spring bar 510 can be configured as a locating feature and/or a bearing surface for interfacing with external components to maintain a positional relationship of the external components about the axis 502. The torsion bar spring 500 can therefore be a multifunctional device that can act not only as a spring, but as a hinge pin as well, thus eliminating the need for an external torsion spiral spring that may otherwise be associated with a hinge pin in such applications. Due to the compact nature of the torsion bar spring 500 and its multifunctional aspect of a self-contained spring-loaded hinge pin, the torsion bar spring 500 can minimize part count, volume, and weight in many applications.

Figure 6:
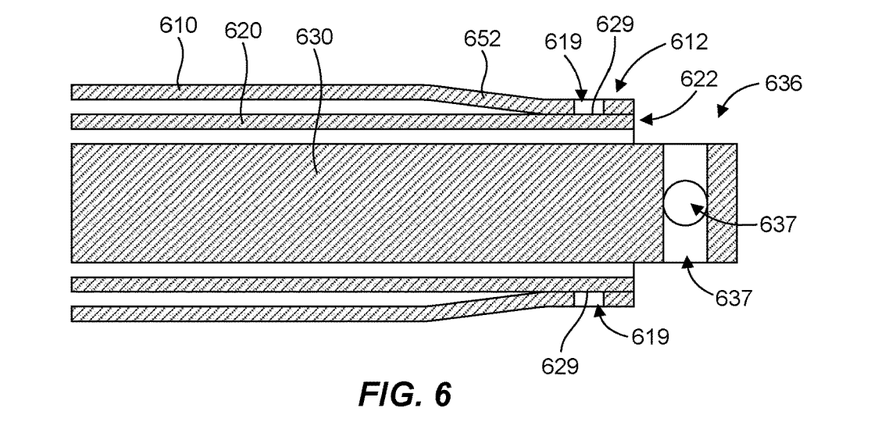
FIG. 6 is a cross-sectional side view of an end of an elongated spring bar in accordance with an example of the present disclosure.

FIG. 6 illustrates a cross-sectional side view of an end of an elongated spring bar in accordance with another example. In this case, coupling interface portions 612, 622 of respective elongated spring bars 610, 620 are configured to facilitate welding to one another. For example, the coupling interface portion 612 includes one or more openings 619 that can be configured to receive weld or adhesive material and provide access to a surface of the 629 of the coupling interface portion 622. In some embodiments, a plug weld can be applied to the openings 619 and the surface 629 to couple the coupling interface portions 612, 622 to one another. This approach can be beneficial when utilizing relatively thin-walled elongated spring bars, such as the elongated spring bars 610, 620. The elongated spring bar 610 can be tapered or swaged 652 between an uncoupled portion of the elongated spring bar 610 and the coupling interface portion 612. In one aspect, a mounting portion 636 associated with an elongated spring bar 630 can have internal features 637 (i.e., openings or holes) configured to receive one or more protrusions of an external component.

Figure 7:
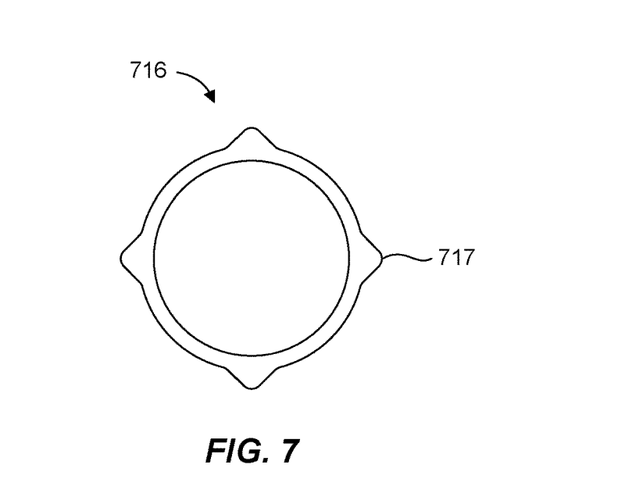
FIG. 7 is an end view of a mounting portion of an elongated spring bar in accordance with an example of the present disclosure.

FIG. 7 illustrates an end view of a mounting portion 716 of an elongated spring bar, in accordance with another example. In this case, the mounting portion 716 has external features 717, such as protrusions, configured to mate or interface with an external component. This configuration can be beneficial when utilizing relatively thin-walled elongated spring bars.

Figure 8:
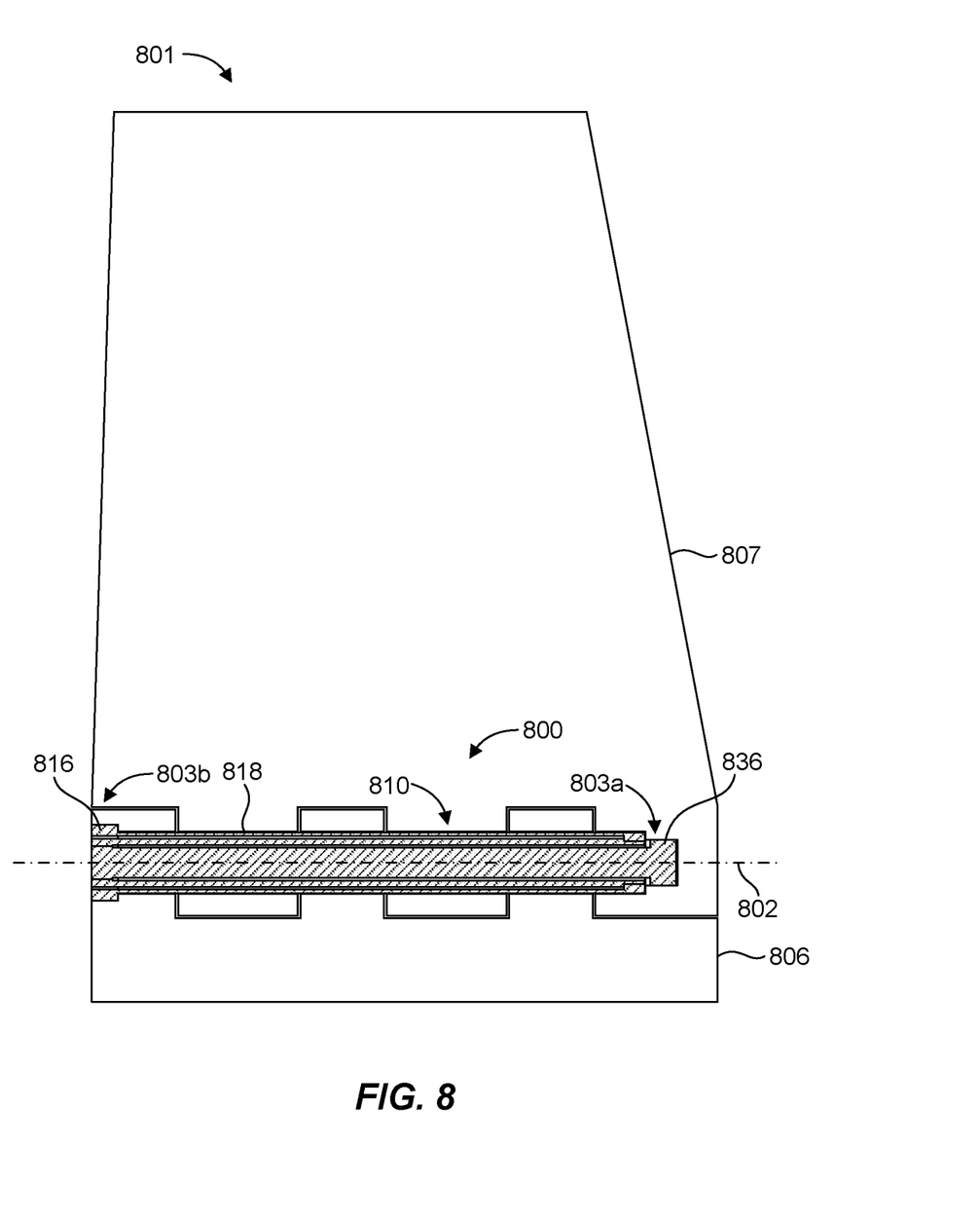
FIG. 8 illustrates a torsion bar spring system in accordance with an example of the present disclosure.

FIG. 8 illustrates a torsion bar spring system 801 in accordance with an example of the present disclosure. The system 801 can include components 806, 807 and a torsion bar spring 800 operably coupled to the components 806, 807 to facilitate relative rotation of the components 806, 807. The torsion bar spring 800 can be of any suitable configuration disclosed herein. In the illustrated example, the torsion bar spring 800 is configured similar to the torsion bar springs 400 and 500, where elongated spring bars are arranged such that mounting portions 816, 836 for coupling the torsion bar spring 800 to the external components 806, 807 are located at opposite ends (e.g., distal 803*a* and proximal 803*b* ends) of the torsion bar spring 800. The system 801 can be considered a type of spring-loaded hinged mechanism that requires torsional force or torque between the connected components 806, 807. In one aspect, an outer surface 818 of an outer elongated spring bar 810 can be configured as a locating feature and/or a bearing surface for interfacing with the components 806, 807 to maintain a positional relationship of the components 806, 807 about an axis 802. In this case, the torsion bar spring 800 can be configured as a hinge pin for the spring-loaded hinged mechanism of the system 801.

In the illustrated example, the component 806 can be the body of a missile and the component 807 can be a control surface of the missile. It should be apparent that torsion bar springs as disclosed herein can be used in many military and commercial applications, such as in deployable/retractable devices (e.g., fins, wings, launcher lugs, seeker/sensor optics covers, etc.) or to offset motor torque needed when moving objects (e.g., hinged covers/lids, doors, etc.). In one example, a torsion bar spring as disclosed herein can be used in the regenerative braking of a vehicle where the stored energy is released to assist acceleration.

In accordance with one example, a method for facilitating spring-loaded relative rotation between two components is disclosed. The method can comprise obtaining a first elongated spring bar made of a resiliently flexible material and having a first coupling interface portion at a distal end and an interior opening oriented along a longitudinal axis. The method can also comprise obtaining a second elongated spring bar made of a resiliently flexible material and having a second coupling interface portion at the distal end. The method can further comprise disposing the second elongated spring bar at least partially in the interior opening of the first elongated spring bar, wherein the first and second elongated spring bars are directly coupled to one another at the first and second coupling interface portions such that uncoupled portions of the first and second elongated spring bars are rotatable relative to one another about the longitudinal axis. Additionally, the method can comprise facilitating coupling a first component to the first elongated spring bar and coupling a second component to the second elongated spring bar. It is noted that no specific order is required in this method, though generally in one embodiment, these method steps can be carried out sequentially.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A torsion bar spring, comprising:
a first elongated spring bar made of a resiliently flexible material and having a first internal coupling interface portion at a distal end and an interior opening oriented along a longitudinal axis; and
a second elongated spring bar, independent of the first elongated spring bar, the second elongated spring bar made of a resiliently flexible material and having a second internal coupling interface portion at the distal end,
wherein the second elongated spring bar is disposed at least partially in the interior opening of the first elongated spring bar and the first and second elongated spring bars are directly fixedly coupled to one another at the first and second internal coupling interface portions such that uncoupled portions of the first and second elongated spring bars are rotatable relative to one another about the longitudinal axis, and
wherein at least one of the first or second internal coupling interface portions comprises an integrally formed shoulder extending radially relative to the longitudinal axis.

2. The torsion bar spring of claim 1, wherein the first and second elongated spring bars are made of the same resiliently flexible material.

3. The torsion bar spring of claim 2, wherein the first and second elongated spring bars are made of a metal material.

4. The torsion bar spring of claim 1, wherein the first and second coupling interface portions are welded to one another.

5. The torsion bar spring of claim 1, wherein the first elongated spring bar comprises a tubular configuration.

6. The torsion bar spring of claim 1, wherein the second elongated spring bar is solid.

7. The torsion bar spring of claim 1, further comprising a first mounting portion associated with the first elongated spring bar at a proximal end, and a second mounting portion associated with the second elongated spring bar at the proximal end, wherein the first and second mounting portions facilitate coupling of the torsion bar spring to external components.

8. The torsion bar spring of claim 1, wherein an outer surface of the first elongated spring bar is configured as a bearing surface to interface with an external component.

9. The torsion bar spring of claim 1, wherein the second elongated spring bar comprises a second interior opening oriented along the longitudinal axis.

10. The torsion bar spring of claim 9, wherein the second elongated spring bar comprises a tubular configuration.

11. The torsion bar spring of claim 9, wherein the second elongated spring bar comprises a third coupling interface portion at a proximal end, and further comprising a third elongated spring bar made of a resiliently flexible material and having a fourth coupling interface portion at the proximal end, wherein the third elongated spring bar is disposed at least partially in the interior opening of the second elongated spring bar and the second and third elongated spring bars are directly coupled to one another at the third and fourth coupling interface portions such that uncoupled portions of the second and third elongated spring bars are rotatable relative to one another about the longitudinal axis.

12. The torsion bar spring of claim 11, wherein the third elongated spring bar is solid.

13. The torsion bar spring of claim 11, wherein the third elongated spring bar comprises a tubular configuration.

14. The torsion bar spring of claim 11, further comprising a first mounting portion associated with the first elongated spring bar at the proximal end, and a second mounting portion associated with the third elongated spring bar at the distal end, wherein the first and second mounting portions facilitate coupling the torsion bar spring to external components.

15. A torsion bar spring system, comprising:
a first component;
a second component; and
a torsion bar spring operably coupled to the first component and the second component to facilitate relative rotation of the first and second components, the torsion bar spring comprising
a first elongated spring bar made of a resiliently flexible material and having a first internal coupling interface portion at a distal end and an interior opening oriented along a longitudinal axis, and
a second elongated spring bar, independent of the first elongated spring bar, the second elongated spring bar made of a resiliently flexible material and having a second internal coupling interface portion at the distal end,
wherein the second elongated spring bar is disposed at least partially in the interior opening of the first elongated spring bar and the first and second elongated spring bars are directly fixedly coupled to one another at the first and second internal coupling interface portions such that uncoupled portions of the first and second elongated spring bars are rotatable relative to one another about the longitudinal axis,
wherein an entire outer surface of the first elongated spring bar is configured as a bearing surface and interfaces with at least one of the first and second components, and
wherein the first and second components are hinged about the torsion spring bar, whereby the first and second components are rotatable about the longitudinal axis relative to each other in opposite rotational directions, such that the torsional spring bar provides a spring loaded hinge mechanism for the first and second components.

16. The system of claim 15, wherein the first component or the second component is a control surface of a missile, and the other of the first and second components is a body of the missile.

17. The system of claim 15, wherein at least one of the first and second interface portions comprises a shoulder extending radially relative to the longitudinal axis.

18. The system of claim 15, wherein the first and second interface portions comprise complementary protrusions circumferentially offset from one another about the longitudinal axis.

19. A method for facilitating spring-loaded relative rotation between two components, comprising:
obtaining a first elongated spring bar made of a resiliently flexible material and having a first internal coupling interface portion at a distal end and an interior opening oriented along a longitudinal axis;

obtaining a second elongated spring bar, independent of the first elongated spring bar, the second elongated spring bar made of a resiliently flexible material and having a second internal coupling interface portion at the distal end;

disposing the second elongated spring bar at least partially in the interior opening of the first elongated spring bar, wherein the first and second elongated spring bars are directly fixedly coupled to one another at the first and second internal coupling interface portions to prevent relative movement of the first and second elongated spring bars in a rotational degree of freedom and in a translational degree of freedom about the longitudinal axis about the first and second coupling interface portions such that uncoupled portions of the first and second elongated spring bars are rotatable relative to one another about the longitudinal axis; and facilitating coupling a first component to the first elongated spring bar and coupling a second component to the second elongated spring bar wherein at least one of the first or second internal coupling interface portions comprises an integrally formed shoulder extending radially relative to the longitudinal axis.

* * * * *